US011772158B2

(12) United States Patent
Hannah et al.

(10) Patent No.: US 11,772,158 B2
(45) Date of Patent: Oct. 3, 2023

(54) METHOD FOR SELECTIVELY OXIDIZING METALS OF AN ALLOY

(71) Applicant: Aurum Integra Inc., Grimsby (CA)

(72) Inventors: Maurice-Michael Hannah, Hamilton (CA); Kevin Luttjehuizen, Dunnville (CA)

(73) Assignee: Aurum Integra Inc., Grimsby (CA)

( * ) Notice: Subject to any disclaimer, the term of this patent is extended or adjusted under 35 U.S.C. 154(b) by 80 days.

(21) Appl. No.: 16/977,331

(22) PCT Filed: Mar. 1, 2019

(86) PCT No.: PCT/CA2019/050251
§ 371 (c)(1),
(2) Date: Sep. 1, 2020

(87) PCT Pub. No.: WO2019/165560
PCT Pub. Date: Sep. 6, 2019

(65) Prior Publication Data
US 2021/0170489 A1 Jun. 10, 2021

Related U.S. Application Data

(60) Provisional application No. 62/636,878, filed on Mar. 1, 2018.

(51) Int. Cl.
*B22F 9/08* (2006.01)
*C22B 9/16* (2006.01)
*C22B 9/14* (2006.01)

(52) U.S. Cl.
CPC ................ *B22F 9/082* (2013.01); *C22B 9/14* (2013.01); *C22B 9/16* (2013.01);
(Continued)

(58) Field of Classification Search
CPC ...................................................... B22F 9/082
See application file for complete search history.

(56) References Cited

U.S. PATENT DOCUMENTS

| 981,451 A | 1/1911 | Mckechnie et al. |
| 3,043,678 A | 7/1962 | Lowry et al. |

(Continued)

FOREIGN PATENT DOCUMENTS

| CA | 2237171 | 2/1997 |
| CN | 102325911 A | 1/2012 |

(Continued)

OTHER PUBLICATIONS

ASM Handbook; Metals Handbook Desk Edition, 2nd Edition, p. 624; J.R. Davis, 1998 (Year: 1998).*

(Continued)

*Primary Examiner* — Kevin E Yoon
*Assistant Examiner* — Austin Pollock
(74) *Attorney, Agent, or Firm* — Gowling WLG (Canada) LLP

(57) ABSTRACT

A method of selectively oxidizing one or more target metals in an alloy comprising target and non-target metals is provided. The method comprises the steps of: i) melting the alloy and exposing the molten alloy to simultaneous fragmentation and oxidation in the presence of an oxygenated atomizing gas under conditions sufficient to yield an oxidation potential that oxidizes the one or more target metals in the alloy and does not oxidize the non-target metal(s); and ii) allowing the treated alloy to solidify. The method is useful to purify a non-target base metal. The method is also useful to produce a metal compound comprising a desired content of one or more oxidized target metals above the theoretical maximum generally achieved by thermal plasma spray surface coating applications.

8 Claims, 6 Drawing Sheets

(52) U.S. Cl.
CPC .......... *B22F 2009/0836* (2013.01); *B22F 2009/0844* (2013.01); *B22F 2201/03* (2013.01); *B22F 2301/25* (2013.01)

(56) References Cited

U.S. PATENT DOCUMENTS

| | | | |
|---|---|---|---|
| 3,647,423 A | | 3/1972 | Acoveno |
| 3,672,870 A | | 6/1972 | Rhydderch |
| 3,846,120 A | * | 11/1974 | Hawkes .................. C21C 5/56 75/387 |
| 3,979,205 A | | 9/1976 | Wanzenberg |
| 4,085,923 A | | 4/1978 | Queneau et al. |
| 4,138,249 A | | 2/1979 | Rosof |
| 4,415,540 A | | 11/1983 | Wilkomirsky et al. |
| 4,426,225 A | | 1/1984 | Ida et al. |
| 4,491,473 A | | 1/1985 | Bowman et al. |
| 4,668,289 A | | 5/1987 | Langer et al. |
| 5,102,453 A | | 4/1992 | Yerushalmi |
| 5,385,601 A | | 1/1995 | Kemeny et al. |
| 5,496,392 A | | 3/1996 | Sims et al. |
| 5,503,655 A | | 4/1996 | Joseph |
| 5,728,197 A | | 3/1998 | Seegopaul et al. |
| 5,989,491 A | | 11/1999 | Isomoto et al. |
| 5,993,512 A | | 11/1999 | Pargeter et al. |
| 7,431,750 B2 | * | 10/2008 | Liao .................. B22F 9/082 75/346 |
| 7,993,577 B2 | | 8/2011 | Duz et al. |
| 9,057,118 B2 | | 6/2015 | Deegan et al. |
| 9,833,835 B2 | | 12/2017 | Anderson et al. |
| 2018/0169763 A1 | * | 6/2018 | Dorval Dion ............. B29B 9/10 |
| 2021/0126300 A1 | * | 4/2021 | Togashi .................. B22F 1/00 |

FOREIGN PATENT DOCUMENTS

| | | | | |
|---|---|---|---|---|
| CN | 103436708 A | * | 12/2013 | |
| CN | 103834899 A | | 6/2014 | |
| WO | 9403760 A1 | | 2/1994 | |
| WO | WO-9705294 A1 | * | 2/1997 | .......... C22B 11/021 |
| WO | 2014154945 A1 | | 10/2014 | |
| WO | 2014208419 A1 | | 12/2014 | |
| WO | 2016095031 A1 | | 6/2016 | |
| WO | 2018035599 A1 | | 8/2016 | |

OTHER PUBLICATIONS

ASM Handbook; Powder Metallurgy, vol. 7, Atomization, p. 58-71 (Year: 2015).*
Fuliang Yang et al., Effect of extrusion . . . alloy, Frontiers of Mechanical Engineering in China, Mar. 1, 2007, pp. 120-124, vol. 2, No. 1, Higher Education Press, BE.
Yu Qi, Metal Recovery from Steelmaking Slag, Jan. 1, 2018, URL: https://tspace.library.utoronto.ca/bitstream/1807/82878/3/Yu_Qi_201803_MAS_thesis.pdf, pp. 1,4,5,100,102.
European Search Report dated Oct. 27,2021—PCT/CA2019050251.
Written Opinion—dated Oct. 27, 2021—PCT/CA2019050251.
International Search Report dated May 24, 2019—PCT/CA2019/050251.
Written Opinion dated May 24, 2019—PCT/CA2019/050251.
Guillen et al.—"Oxidation Behavior of In-Flight Molten Aluminum Droplets in the Twin-Wire Electric Arc Thermal Spray Process", 2005 International Thermal Spray Conference May 2-4, 2005.
Brophy et al.—The Structure and Properties of Materials, vol. II, Thermodynamics of Structure, pp. 147-159, pp. 56-63.

* cited by examiner

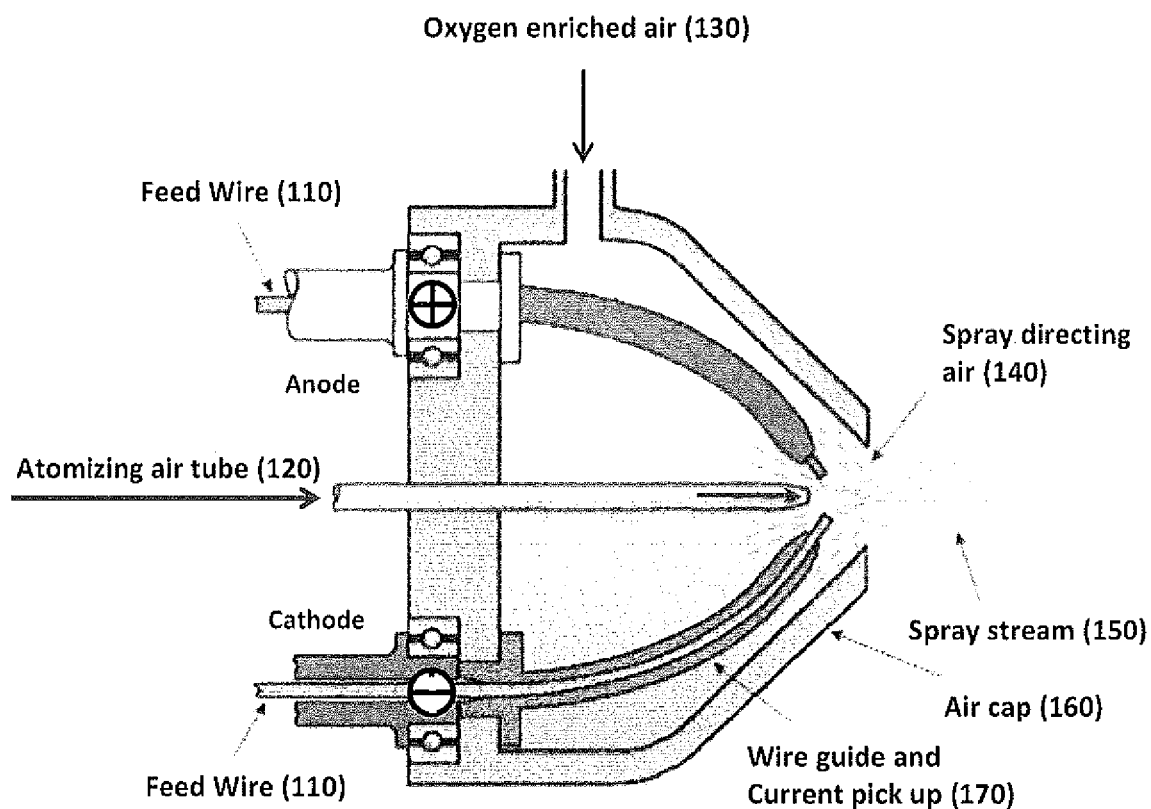
Fig. #2

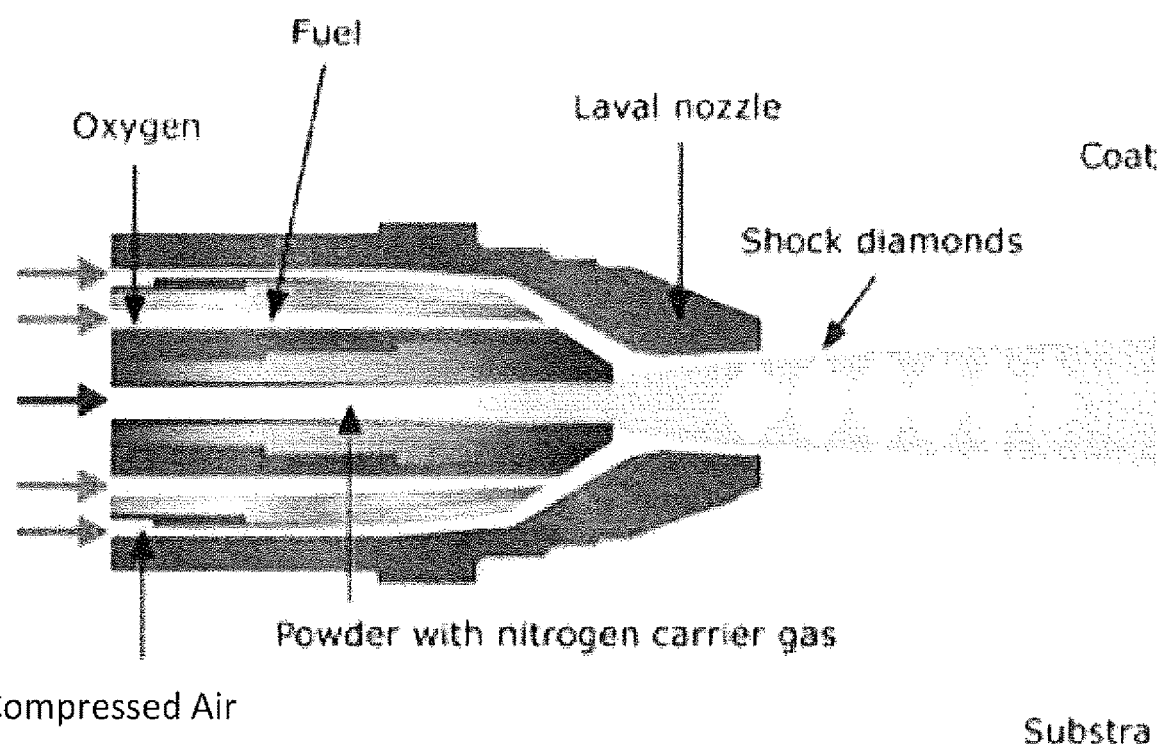
Fig. #3

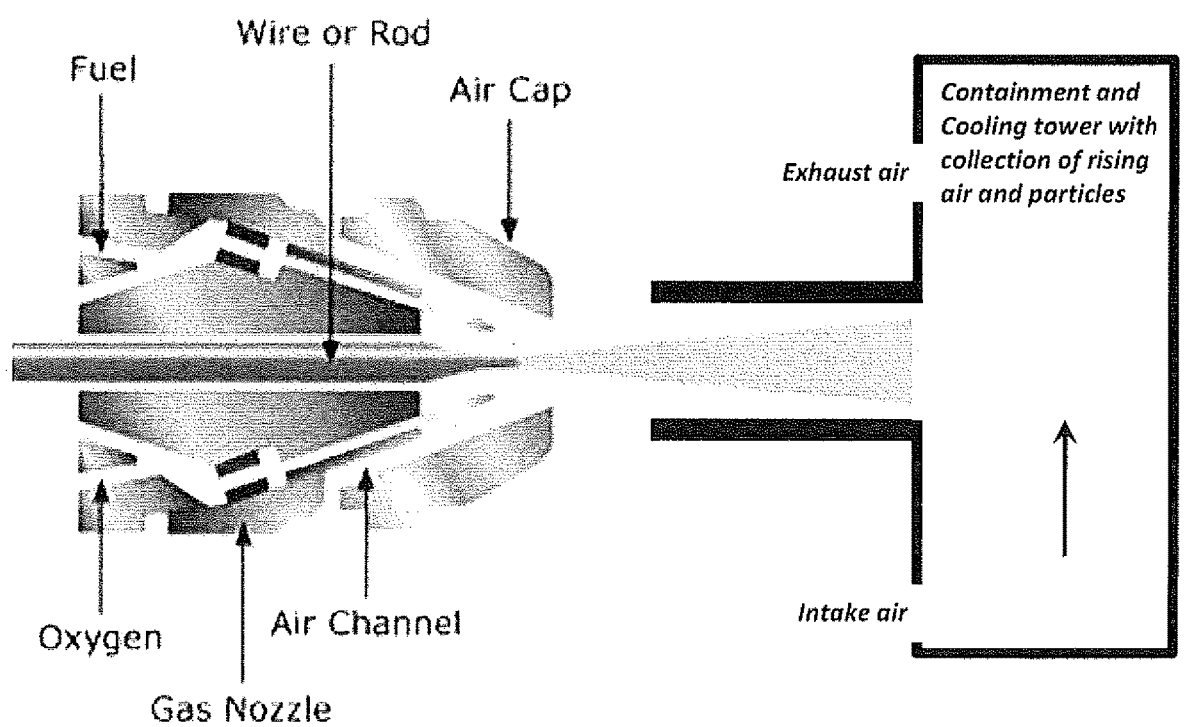
Fig. #4

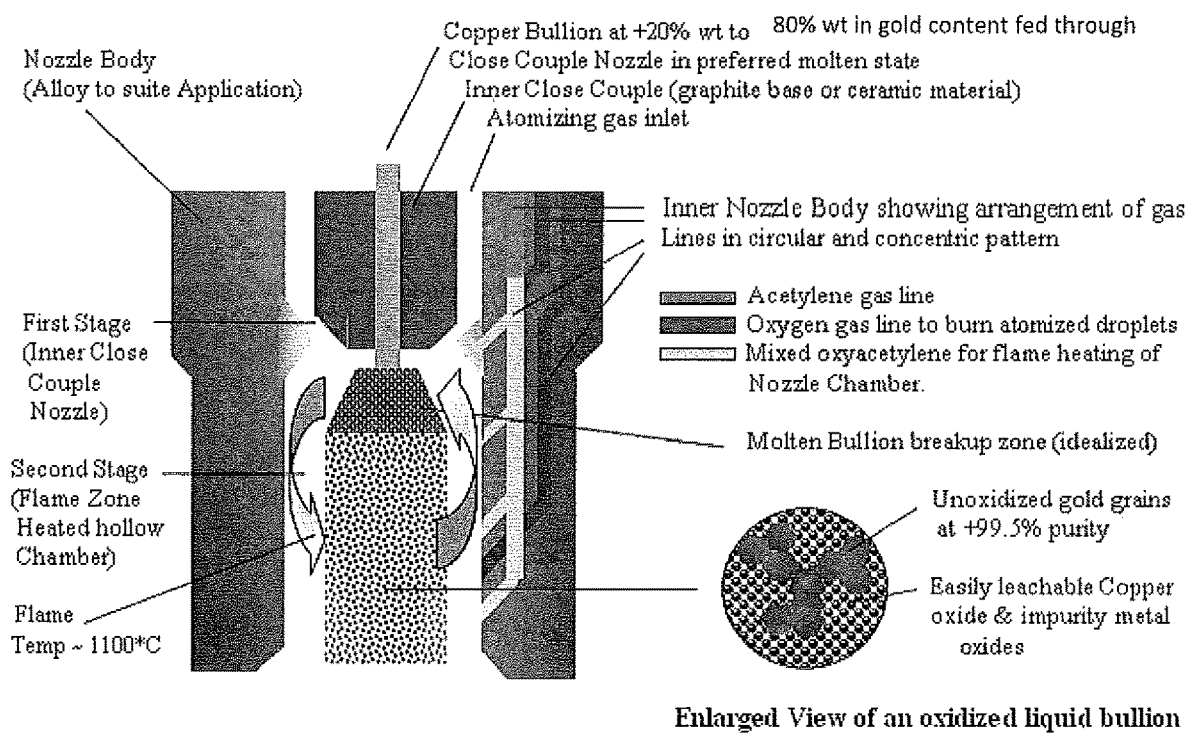
Fig. #5

Containment System Operating Principle:

Inside the cylindrical process containment chamber the thermal spray of oxidized particles are held in a cyclonic motion of a high velocity air/gas stream for further process control of temperature and oxygen pressure. Centrifugal forces carry the particles outwards where they are conveyed downwards to the chamber base. Follow the Heat flow diagram

Design Flexibility:

- Control of ambient air and oxygen saturation level.
- Metal and metal oxide particles are kept apart in gas suspension till solidified and collected dry.
- This eliminates use of cooling water and filtration.
- Adapts well to gas cleaning technologies.

Precision of Containment and Process Chamber

It provides a high degree of automation allowing added control of process conditions.

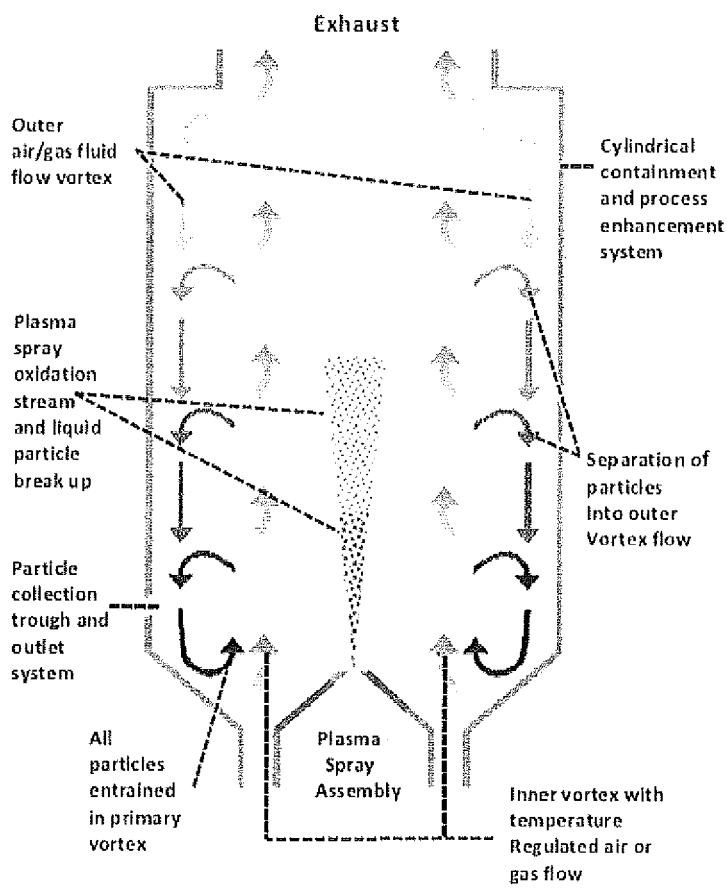

Figure 6

METHOD FOR SELECTIVELY OXIDIZING METALS OF AN ALLOY

FIELD OF THE INVENTION

The invention generally relates to methods of oxidizing metals, and in particular, to methods of selectively oxidizing metals within an alloy. Such methods are useful to effect purification of a common metal from an alloy, for example, by reverse purification techniques of solvent metals including precious and common metals such as gold, silver, platinum and platinum group metals, copper, nickel, and other metals of commercial value. The methods are also useful to produce engineered metal/metal oxide compounds.

BACKGROUND OF THE INVENTION

Precious and/or other commercially valuable metals are commonly incorporated in jewelry, flatware, watches, and art, as well as components for industrial applications such as electronic components, cables, electrical connectors and the like. These products often have a limited lifespan leading to the production of a significant amount of metal-containing scrap.

Methods for recovering precious metals, such as gold, from scrap metal have been developed. There are three principal methods to separate gold from its impurities, including: firing, electro-chemistry, and leaching or dissolution of the gold followed by zinc dust precipitation. The purification of precious metals is made all the more difficult by the similar characteristics of certain metals, such as gold and silver. Both metals have similar melting points and electro-chemical properties. As a result, methods of purifying a precious metal may comprise a combination of firing, leaching, dissolution/precipitation and electrochemical methods.

U.S. Pat. No. 4,426,225 discloses a method of recovering visible gold plate from scrap materials generated in the production of printed circuit boards. The base metal is etched with an aqueous nitric acid etching solution in the presence of a frothing agent and flake gold is recovered in the resulting froth.

U.S. Pat. No. 4,668,289 discloses a method for reclaiming gold in metallic form from gold-containing scrap using a leaching solution that includes halide ions.

Canadian Patent No. 2,237,171 provides a method of purifying gold comprising the step of leaching away impurities from the raw gold by exposing the raw gold to a solution that is highly acidic and which also has a high oxidative potential.

Existing separation technology tends to be complicated, expensive and environmentally unfriendly. Furthermore, the equipment used in the present separation methods required frequent maintenance due to fouling by large amounts of impurities.

Plasma or thermal spray methods are commonly applied in Net Shape manufacturing and in diverse coating applications. Reactive Spray Deposition is a well-developed art that has been applied to in-flight oxidation of a single or binary metal to determine metal oxide content. However, such methods have not been applied for the production of engineered metal/metal oxide compounds or for the purification of precious or common metals from their constituent solute or impurity metals.

Accordingly, there is a need for an efficient, low cost and environmentally-friendly method of purifying base metals of alloys.

SUMMARY OF THE INVENTION

In one aspect of the invention, a method of selectively oxidizing one or more metals in an alloy is provided comprising the steps of:
i) melting the alloy and exposing the molten alloy to simultaneous fragmentation and burning in the presence of oxygen under conditions sufficient to yield an oxidation potential that oxidizes one or more target metals in the alloy; and
ii) allowing the treated alloy to solidify and separating oxidized particles from unoxidized particles in the alloy.

In another aspect, the present invention is directed to a method of purifying a base metal from an alloy in which the alloy in the molten state is exposed simultaneously to both fragmentation and burning in oxygen to oxidize the impurity metals.

Thus, a method of purifying a base metal from an alloy is provided comprising the steps of:
i) melting the alloy and exposing the molten alloy to simultaneous fragmentation and burning in the presence of oxygen under conditions sufficient to yield an oxidation potential that is equal to or greater than the oxidation potential of impurities in the alloy and less than the oxidation potential of the base metal;
ii) allowing the treated alloy to solidify and separating oxidized particles from unoxidized particles in the alloy;
iii) collecting the unoxidized particles which is purified base metal; and
iv) optionally repeating steps i) to iii) to enhance the purity of the base metal.

In another aspect, a method of producing a metal compound with a pre-determined oxide content is provided comprising the steps of:
i) melting an alloy and exposing the molten alloy to simultaneous fragmentation and burning in the presence of oxygen under conditions sufficient to yield an oxidation potential that is equal to or greater than the oxidation potential of one or more target metals in the alloy to be oxidized and less than the oxidation potential of non-target metals, and for a time period sufficient to yield a pre-determined extent of oxidation of the target metals; and
ii) allowing the molten alloy to solidify to yield the metal compound having the pre-determined target oxide content.

These and other aspects of the invention will become apparent by reference to the detailed description and the following figures.

BRIEF DESCRIPTION OF THE FIGURES

FIG. 2 illustrates a wire form arc thermal spray device;

FIG. 3 illustrates an HVOF thermal spray device for powder form injection;

FIG. 4 illustrates an HVOF thermal spray device for a wire form feedstock;

FIG. 5 illustrates an HVOF thermal spray device for gravity feed of a molten liquid form feedstock; and FIG. 6 illustrates a thermal spray device and containment system for use to conduct a method in accordance with an embodiment of the invention.

DETAILED DESCRIPTION OF THE INVENTION

Figure 1:
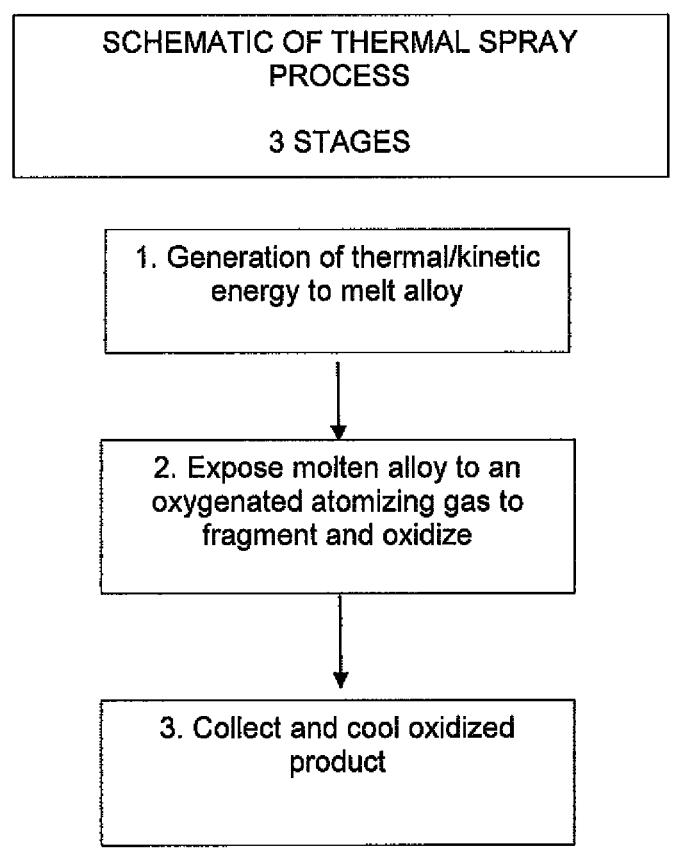
FIG. 1 is a schematic illustrating an embodiment of the invention utilizing a thermo-plasma spray technique to produce certain physio-chemical property changes in a base metal to enable removal of impurity metals from the base metal.

A method of selectively oxidizing one or more metals in an alloy comprising at least one target and non-target metal is provided in one aspect of the invention. The method comprises the steps of: i) melting the alloy and exposing the molten alloy to simultaneous fragmentation and burning in the presence of an oxygen-containing gas under conditions that result in an oxidation potential sufficient to oxidize one or more target metals in the alloy and which is less than the oxidation potential of the non-target metal; and ii) allowing the treated alloy to solidify.

In a first step of the method, the alloy is subjected to conditions sufficient to melt, fragment and oxidize target metals in the alloy. The alloy may be in solid form (wire), powder form, or in liquid form. As one of skill in the art will appreciate, the conditions utilized to melt, fragment and oxidize the target metals will vary with the particular alloy to be treated, the pressure of the environment in which the treatment is conducted, the gas used in the treatment, and the extent to which metals within the alloy are to be oxidized. In this regard, the conditions, e.g. temperature used to melt the alloy, force of the gas to achieve fragmentation (pressure of atomizing gas) of the molten alloy and oxygen activity of the oxygenated atomizing gas, will be sufficient to result in molten alloy particles and an oxidation potential that is equal to or greater than the oxidation potential of the target metals to be oxidized, but less than the oxidation potential of the metal or metals which are not to be oxidized, i.e. non-target metals.

As one of skill in the art will appreciate, the conditions selected are dictated by the oxidation potential required to selectively oxidize the target metals which does not oxidize the non-target metals. Conditions of temperature to melt the alloy, pressure or force of the atomizing oxygenated gas, oxygen activity of the atomizing gas, are thus, selected according to the Nernst and Tafel equations to achieve oxidation of target metals.

To melt the alloy, generally a temperature that is less than the melting temperature of the alloy is used, for example, about 15-25% less than the melting temperature of the alloy, or about 20% below the melting temperature of the alloy. In the presence of oxygen, oxidation occurs, which causes the temperature to increase to a temperature at which fragmentation of the alloy into molten particles occurs, and the formation of oxides. Fragmentation generally occurs at a temperature between the liquidus temperature of the alloy and about 200° C. greater than the liquidus temperature. Generally a temperature in the range of about 1150-2000° C. will be employed in the present method.

The method may be conducted using a thermal spraying device. Using a thermal spraying device, the alloy is exposed to plasma melting coupled with exposure to air, oxygen or an oxygen-enriched gas jet to fragment the molten metal phase into molten metal particles which simultaneously ignite the target metals to selectively form metal oxides which may then be separated from the base or solvent metal(s) (e.g. gold or other commercially valuable metal).

Any of the thermal spraying devices generally used in the metal coating industry may be used in the present method with or without design modifications to fragment and selectively oxidize an alloy. Examples of thermal spraying devices that may be used include devices for standard plasma spraying, detonation spraying, wire arc spraying, high velocity oxy-fuel coating spraying (HVOF) and high velocity air fuel (HVAF) as is described in more detail herein. In a preferred embodiment, a wire arc spraying device is used.

Contrary to the conventional use of thermal spray technology, a thermal spray device is used to conduct the present method under oxidizing conditions, rather than under conventional thermal spray conditions which minimize oxidation. In this regard, the conditions are selected to achieve an oxidation potential that results in oxidation of target metals but not non-target metals. Generally, the power (V) applied using a thermal spray device, e.g. a wire arc spray device, in accordance with the present method, will be less than the difference in oxidation potential between a first target metal with the least oxidation potential and a second target or non-target metal with the next closest oxidation potential within the alloy. Applying power at this level will allow oxidation of the first target metal at an appropriate viscosity change (e.g. in the range of about 2-12 $m^2 s^{-1}$) of the molten liquid metal as it undergoes fragmentation and begins spheroidizing. Generally power sufficient to yield a temperature in the range of about 1150-2000° C. is employed using a thermal spray device. This may be achieved using power in the range of about 26.5-35.5 Volts and 150-260 Amperes. As one of skill in the art will appreciate, power (temperature) is selected based on the desired outcome. Increased power resulting in an increased temperature will result in smaller molten particles, e.g. particles of less than about 100 microns, while a decrease in power applied will have the opposite effect. To achieve greater oxidation levels, smaller particles (less than 100 microns) are desirable resulting in a greater surface area, and greater levels of oxidation.

The atomizing oxygenated gas used in the present method will generally comprise at least about 15-20% oxygen up to 100% oxygen, and thus, may be air, oxygen-enriched air or pure oxygen. The atomizing gas is applied at a pressure suitable to fragment the molten alloy into particles of a size appropriate for oxidizing. Generally, the atomizing gas will be applied at a pressure in the range of about 60-100 psi, and preferably in the range of about 70-90 psi. In one embodiment, the gas is oxygen and the pressure utilized is 90 psi+/−10%. In another embodiment, the gas is air (15-20% oxygen) and the pressure utilized is 70 psi+/−10%. As one of skill in the art will appreciate, atomizing gas pressure is selected based on the desired outcome. An increase in atomizing gas pressure, e.g. to 90 psi, will result in smaller molten particles, e.g. particles of less than about 100 microns. A decrease in atomizing gas pressure, e.g. to 70 psi, will result in a decrease in particle viscosity change, and larger particles, e.g. particles in the range of 100-150 microns.

It is noted that the conditions utilized in the present method are interconnected such that altering one condition, e.g. power/temperature or atomizing gas pressure, may affect other conditions. For example, an increase in power applied, e.g. to a power that is greater than the difference is electrode potentials between the first target metal and second target or non-target metal, will increase the particle energy level, increasing the viscosity change such that atomizing gas pressure is increased to initiate fragmentation of the molten metal. Thus, to achieve selective oxidation of a target metal, rate of viscosity change (which is proportional to oxygenation rate) is maintained at a lower kinetic rate than the overall energy of the system to achieve complete or near complete oxidation of the target metal. Oxidation is, thus, controlled by controlling the particle energy level and viscosity change, such that a target metal may be oxidized to a desired extent or to a pre-determined level by altering the power applied (which alters temperature applied) and/or oxygen activity, which ultimately affects rate of oxidation. For example, the kinetic rate of oxidation may be reduced by decreasing oxygen activity (e.g. through a decrease in oxygen pressure) to cease oxidation and achieve a desired level of target metal oxide.

As one of skill in the art will appreciate, other factors may be considered in conducting the present method using a thermal spray device, e.g. a wire arc spray device, which will have an effect on the conditions utilized in the present method. For example, using such a device, the alloy metal is fed into an ignition or flame zone (i.e. zone where melting occurs). The metal alloy feed rate will vary within the range of about 0.035 kg/s to 0.06 kg/s. The greater the metal alloy feed rate, the greater the rate of alloy melting. The feed rate may be altered based on the selected power, atomizing gas pressure and particle size to be achieved. The nozzle used to deliver the atomizing gas may also be varied. The diameter may range from 2-6 mm. The nozzle diameter will dictate the gas to liquid metal loading ratio (G:M), which may vary within the range of 3-10. The nozzle may be altered based on the selected power, atomizing gas pressure and particle size to be achieved. Further, the reactor within which the method is conducted may have an impact. For example, the shape of the reactor, e.g. conical vs. cylindrical, may have an impact on the results achieved with the present method, and thus, can be varied to achieve desired results.

While not wishing to be bound by any particular theory, the present method is based on thermo-chemical equilibrium theory in which the high temperature oxygen-containing gas acts as the electrolyte and the molten metal particles exchange electrons with the oxygen atoms in an anodic reaction to form oxides at the interface of the metal particle and the atomizing gas jet stream.

In one aspect of the invention, a method of selective oxidation may be used in a method of purifying a base metal from an alloy. The method comprises melting the alloy and exposing the molten alloy to simultaneous fragmentation to form molten particles and burning in the presence of an oxygenated gas to oxidize impurities in the alloy particles; separating oxidized particles from unoxidized metal particles in the alloy once solidified, and optionally repeating the simultaneous fragmentation and oxidation step followed by a separation step to yield the purified base metal.

An alloy generally comprises a base or solvent metal and impurity (solute) metals or other elements. Base metals include metals of high economic value which may be precious metals, such as ruthenium (Ru), rhodium (Rh), palladium (Pd), silver (Ag), osmium (Os), iridium (Ir), platinum (Pt), and gold (Au), or other metals such as rhenium (Re), nickel (Ni) and copper (Cu). Base metals may be purified from alloys used to make various items, including, but not limited to, jewelry, flatware, watches, artistic works, coins, dental inserts, glass frames, solder, as well as components for industrial applications such as electronic components, cables, electrical connectors, printed circuit boards, catalytic converters, and the like.

In accordance with the present method, a valuable base metal may be recovered from an alloy in an item that may be considered waste and destined to be discarded. The present method also provides a means to separate a base metal (e.g. a precious metal) from one or more other metals of value (e.g. another precious metal) in an alloy, for example, to separate silver from gold, or to separate a platinum group metal (i.e. ruthenium, rhodium, palladium, osmium, iridium, and platinum) from gold or from each other. In using the present method, not only is the base or solvent metal recovered, but solute or impurity metals are also recoverable.

In a first step of the method, the alloy is melted and exposed to fragmentation and oxidation under conditions suitable to selectively oxidize the target impurity or solute metals in the alloy without oxidizing the base or solvent metal of the alloy. As above, the conditions employed in the method will vary with the particular alloy (i.e. the metal content of the alloy) to be treated. In this regard, the conditions, e.g. melting temperature, atomizing gas pressure and oxygen activity, are selected to result in molten alloy that is fragmented by the oxygenated gas to form molten particles which are simultaneously oxidized at an oxidation potential that is equal to or greater than the oxidation potential of the target metals to be oxidized, but less than the oxidation potential of the metal or metals which are not to be oxidized, i.e. non-target metals.

A thermal spraying device, such as standard plasma spraying devices, detonation spraying, wire arc spraying, high velocity oxy-fuel coating spraying (HVOF), high velocity air fuel (HVAF), or any of the thermal spraying devices generally used in the metal coating industry, may be used in the present method with or without design modifications, to plasma melt the alloy and fragment the molten metal phase into small molten metal particles and simultaneously ignite the impurity metals to form metal oxides by exposure to an oxygen-enriched gas jet.

A thermal spray device typically consists of the following: spray torch (or spray gun), the core device performing the melting and acceleration of the particles to be ignited in the initial stage of spray oxidization, feeder for supplying the alloy to be purified in powder, wire or liquid form to the torch or spray gun, gas or liquid supply for the generation of the flame or plasma jet, a gas or liquid for carrying the alloy to be purified. In the present method, a source of oxygen is required (e.g. an oxygen-containing gas comprising at least about 15-20% oxygen as in air, or oxygen in a liquid state to suit the design of the thermal/plasma spray device) to enable ignition and oxidation of metal impurities in the alloy. Thermal spray and an auxiliary containment system to collect the oxidized powder is illustrated in FIG. 1.

In plasma thermal spraying, an inert gas (e.g. hydrogen, helium, argon or mixtures thereof) is generally used to generate the flame or plasma jet. The gas is fed past an electrode to induce the "plasma" state of the gases, followed by release of the gas and return to its natural end state which produces an immense heat or 'plasma' flame. In the present method, the alloy (in powder, liquid, suspension or wire form) is injected into or exposed to the plasma spray "flame" to result in ignition, melting and then fragmentation of the alloy into molten particles of both base metal and impurities. Thus, the heat generated by the plasma must be sufficient to ignite the alloy which initiates oxidation, an exothermic reaction that generates the heat that converts the alloy into molten particles, e.g. that melts and fragments the alloy, including both the base/solvent metal and the impurity or solute metal particles. The ignition temperature is generally within a range that results in a cherry red hot glow of the metal alloy in its plastic mechanical state. This temperature range is generally within 20% below the melting temperature of the alloy. Oxidation generally raises the temperature to one which is between the melting point of the base/solvent metal and about 200° C. greater than the melting point of the base metal, particularly in cases in which the alloy comprises high levels of the base metal, e.g. comprises 90% by wt or greater of the base metal. As is known by those of skill in the art, alloys generally have a melting range, including a first temperature at which the alloy begins to melt (solidus) and a second temperature at which the melting is just complete (liquidus). Thus, for alloys, the fragmentation temperature may be between the liquidus temperature and about 200° C. greater than the liquidus temperature. However, this will depend on the proportion and the nature of the metals in the alloy. Eutectic compositions have a lower melting point than the melting point of each of its components. Generally, the lowest temperature that will result in fragmentation of the alloy into molten particles is preferred to maximize the oxidation potential of the partial pressure of oxygen in the fragmenting gas spray jet to oxidize the impurity metals.

A detonation thermal spraying device utilizes detonation of oxygen combined with a fuel (e.g. acetylene) to ignite an alloy and produce the heat necessary to result in fragmentation of the alloy into molten particles.

Wire arc thermal spraying devices utilize two consumable alloy metal wires which are fed independently into the spray gun as illustrated in FIG. 2. These wires are then charged by an electrical power source and an arc is generated between them. The heat from this arc melts the incoming alloy (e.g. wire) which is then entrained in an air jet from the gun to result in fragmentation into molten particles.

High velocity oxy-fuel (HVOF) spraying devices utilize a gaseous mixture or liquid fuel and oxygen which is fed into a combustion chamber, where they are ignited and combusted continuously. The fuels may be gases (hydrogen, methane, propane, propylene, acetylene, natural gas, etc.) or liquids (kerosene, etc.). The hot pressurized gas is propelled through a spray gun at high speed. An alloy feed stock in powder or molten form is injected into the hot gas stream to result in the desired molten fragmentation and oxidation. The HVOF device may include design modifications. For example, the device may include a close couple Laval nozzle (or convergent-divergent nozzle types) as illustrated in FIG. 3. A single alloy wire feed may be utilized with a standard air cap nozzle design as illustrated in FIG. 4. Additionally, induction melting with gravity feed in conjunction with HVOF and a standard close coupled divergent nozzle may be utilized as illustrated in FIG. 5.

Fragmentation of the alloy to form molten particles is simultaneous with exposure of the particles to an oxidizing gas under conditions sufficient to result in ignition burn and oxidation of the impurity or solute metals in the alloy. While the size of the particles resulting from fragmentation is not particularly restricted, particles in the range of 20-200 microns are suitable, preferably, 50-150 microns or 100-150 microns. The oxidation conditions are such that the impurity (solute) particles oxidize to form metal oxides before the molten base metal particles solidify, i.e. while the base metal particles remain molten and unoxidized. Thus, process parameters (such as fragmentation temperature, and oxidizing gas pressure and oxygen concentration) are selected such that the oxidization potential of the impurity metals) is lower than the oxidization potential of the base metal to be purified as previously described. Thus, oxidation of the impurity metals preferentially occurs, while oxidation of the base/solvent metal does not occur. Thus, the present method results in selective oxidation of the alloy in which the solvent metal is unaffected, while one or more other components of the alloy (solute metals) oxidize readily or anodically.

Oxidation potentials of some metals are shown in the following table:

TABLE 1

| Free Energy of Formation of Metal Oxides (per oxygen atom at 227° in Kcal | |
|---|---|
| Metal | Metal Oxide energy of formation (Kcal) |
| Calcium | −138.2 |
| Magnesium | −130.8 |
| Aluminum | −120.7 |
| Titanium | −101.2 |
| Sodium | −83.0 |
| Chromium | −81.6 |
| Zinc | −71.3 |
| Hydrogen | −58.3 |
| Iron | −55.5 |
| Cobalt | −47.9 |
| Nickel | −46.1 |
| Copper | −31.5 |
| Silver | +0.6 |
| Gold | +10.5 |

Table 1 (taken from the text by Brophy et al. *The Structure and Properties of Materials, Volume II Thermodynamics of Structure*. Chapter 9. John Wiley and Sons, Inc.) lists some typical metals in descending order according to their tendency to oxidize based on the free energy change accompanying the formation of its oxide. Oxidation can occur spontaneously if it is accompanied by a free energy decrease. For example, metals having a negative free energy of oxide formation will react with oxygen. Oxidation reactions are thermodynamically possible when they decrease the free energy of the alloy system made of solvent and solute metals.

The thermal spray device is connected to a containment chamber within which the molten alloy is subjected to fragmentation/oxidation, and the resulting oxidized and non-oxidized particles are collected for further processing and/or separation to yield desired purified products. In one embodiment, the containment chamber includes regulated temperature and gas flow which functions to collect solidified oxidized and non-oxidized particles, for example, the particles may be subject to cyclonic motion by a high velocity air/gas stream for further control of temperature and oxygen pressure within the chamber, and carried by centrifugal forces outwards and downwards to a collection trough or outlet. This embodiment is exemplified in FIG. 6, and provides control of ambient air and oxygen saturation level, ii) keeps metal and metal oxide particles apart in gas suspension until solidified and collected dry, iii) eliminates the use of cooling water and filtration, iv) adapts well to gas cleaning technologies, and v) provides a high degree of automation allowing added control of process conditions.

In another embodiment, the containment chamber may include a collection tube coated with a non-reactive coating having a low co-efficient of friction (e.g. polytetrafluoroethylene) through which an inert liquid, such as water, can flow to facilitate solidification and collection of oxidized and non-oxidized particles.

Oxidized impurity (solute) metal fragments are then separated from base (solvent) metal fragments. In one embodiment, the metal oxides are separated from the solvent metal by exposure to a lixiviant (an aqueous solvent medium) in an amount and under conditions sufficient to dissolve the metal oxides. The conditions sufficient to dissolve the metal oxide (s) may vary with the metals of the original alloy, the mechanism of oxidation and the nature of the metal oxide particles resulting from the fragmentation/oxidation step. For example, separate metal oxide and precious metal fragments may form. The metal oxides may be porous, non-porous, and may form as a boundary layer on the precious or base metal surface. The lixiviant is selected such that it has a high tendency to complex with target metal cation impurities. In particular, the lixiviant will have an acidic dissociation constant and an oxidative potential that results in dissolution of the target metal oxides and not the precious/solvent metal to be purified, e.g. will have a pH which is lower than the pH required to dissolve the unoxidized particles. In one embodiment, a non-toxic acid solution may be used, e.g. non-chloric (including chloric/nitric mixtures), and non-cyanide solutions. Suitable organic acids for use to dissolve target metal oxides include, but are not limited to, carboxylic acids such as formic acid, acetic acid, propionic acid, butyric acid, valeric acid, caproic acid, oxalic acid, lactic acid, malic acid, citric acid, benzoic acid and carbonic acid. Mild inorganic acids may also be used such as sulfuric acid, phosphoric acid and boric acid, as well as alkaline lixiviants such as sodium-dihydrogen-phosphate and sodium hydroxide. The acidic or alkaline solution may include additional components to facilitate removal of metal oxides from the treated alloy, e.g. 10-15% hydrogen peroxide as in peroxy-mono-sulfuric acid.

In another embodiment, the impurity metal oxides may be separated from metal in the product resulting from the fragmentation/oxidation treatment using a mechanical method. Since oxides are generally lighter in mass and have a lower specific gravity than metals including their corresponding metal, a media separation or gravity separation step may be utilized to separate the oxides. To facilitate this separation, the product resulting from the fragmentation/oxidation treatment may be subjected to a light impact grinding step. The impurity metal oxides are mechanically loosened and then separated from metal particles in the product by gravity separation. Any appropriate gravity separation technique may be used, utilizing including conventional jigs, pinched sluices (e.g. Reichert cones), spirals, centrifugal jigs and shaking tables. Selective separation of oxides may also be affected by selective froth flotation due to differences between the surface chemistry of oxides.

Following separation of the metal oxides from the treated metal, alloy, either by dissolution, mechanical or aqueous means or by any combination of these. The remaining solid precious/solvent metal may readily be recovered in a pure form. If a solvent (e.g. an acid solution) is used to dissolve metal oxides from the treated alloy, the remaining solvent metal is removed from the acid solution. Generally, the present method will yield a metal product (e.g. precious or other metal) having a purity of at least about 90%, preferably 95% or greater. For alloys comprising 10-15% impurity metals, the present method can achieve a purity of greater than 98%, for example, greater than 99%, 99.5% or 99.95%. Where an alloy comprises impurity levels of greater than 15%, it may be desirable to repeat the method (fragmentation/oxidation and oxide removal) to achieve a metal product of greater purity. Alternatively, the residual high purity Gold or Base metal may be roasted in a Fluid Bed Roaster to further oxidize any trace impurity metals to a removable oxide form. Generally, alloys comprising at least 50% base or solvent metal, and preferably 75% or greater base or solvent metal, are suitable for use in the present method.

Impurity metals may also be recovered using the present method. The acid solution containing dissolved impurity metal oxides may be treated using various techniques to recover the impurity metals. In one embodiment, selective solvent extraction of target metal cations may be conducted to recover one or more of the impurity metals from the acid solution. Selective precipitation with organic or mineral compounds may also be used to recover impurity metals from solution. Thus, by using select complexing agents, pH adjustment and ion exchange, target metals may be removed from the acid solution. For example, bis(3,5-$C_1$-$C_{10}$ alkyl-substituted phenyl) hydrogen phosphate or 8-hydroxyquinoline may be used to selectively remove aluminum from an acid solution; EDTA, sodium dodecyl sulphate and oleic acid may be used to remove nickel from solution; di-2-ethylhexyl phosphoric acid (D2EHPA) and 1-(2-pyridylazo)-2-naphthol (PAN) may be used to remove zinc from solution; and iron may be removed as a ferric sulphate precipitate.

In another aspect, a method of producing a metal compound with a pre-determined oxide content, i.e. one or mixed oxides at specific weight ratios, for example, for use in fuel cells, power cells, electrically and thermally conductive materials, semiconductors with improved catalyst activity and selectivity, and highly porous sponge materials. The method comprises the steps of: i) melting an alloy and exposing the molten alloy to simultaneous fragmentation to form molten particles which are oxidized in the presence of oxygenated gas under conditions sufficient to yield an oxidation potential that is equal to or greater than the oxidation potential of one or more target metals in the alloy to be oxidized and less than the oxidation potential of non-target metals, ii) altering the conditions to yield an oxidation potential that is less than the oxygen potential of the target metals in order to cease oxide formation when the desired level of oxide formation is achieved; and iii) allowing the molten alloy to solidify to yield the metal compound having the pre-determined target oxide content.

As described herein, conditions for conducting the method will vary depending on the alloy to be treated, and the result to be achieved, i.e. the desired oxide content of the alloy. Thus, temperature, pressure, and force/oxygen activity of the oxygenated gas are selected accordingly. While the method is not particularly restricted with respect to the particle size resulting from the fragmentation, particles in the range of 10-150 microns are appropriate, and preferably in the range of 30-100 or 30-90 microns.

As previously described, the conditions may be controlled to control oxide formation, and to prepare from an alloy metal compounds having a desired, predetermined oxide content. In this regard, conditions are selected to oxidize a target metal or metals in the alloy, and once the desired level of oxide formation is achieved, the conditions are altered to yield an oxidation potential that is less than the target metals, thereby ceasing further oxide formation. Oxidation rate is controlled by controlling the particle energy level and viscosity change of the molten metal particles by altering the power applied, and by controlling the oxygen activity, etc. For example, the kinetic rate of oxidation may be reduced by decreasing power applied to decrease particle energy level or by decreasing oxygen activity (e.g. through a decrease in oxygen pressure) to cease oxidation and achieve a desired level of target metal oxide.

Embodiments of the invention are described by reference to the following specific examples which are not to be construed as limiting.

Example 1—Purification of Copper from a Copper-Containing Alloy

Copper was purified from a Cu—Al alloy (91% Cu and 9% Al) wire using thermal spray oxidation as follows. The difference in the oxidation potential between Cu and Al is ~2 EV at standard temperature and pressure. This difference increases as the processing temperature increases according to terms of the Nernst Equation. Thus, using appropriate conditions, aluminum rather than copper can be preferentially oxidized.

Method:

A conventional wire arc plasma spray machine was used to arc two wires of the Cu—Al alloy composition. Two arc runs were conducted using ambient air at a single air pressure setting of 70 psi, and at two power settings, namely, 35.5 volts and 26.5 volts with approximate plasma spray temperatures of ~(1300-1350)° C. and ~(1250-1280)° C., respectively. The oxygen potential at each of these two temperature ranges would be ~700 EV and 800 EV, respectively. It is noted that oxygen potential increases with a decrease in thermal spray temperature.

Results:

SEM analysis of the resulting product showed that three types of the particles were present: pure metal (Cu), $Al_2O_3$ and a bimetal (Cu—$Al_2O_3$). Thus, Al did preferentially oxidize to lead to its separation from the Cu. It was also found that particles arced at the higher Volt setting had a particle size range between ~20-25 microns, while particles arced at the lower Volt setting had a particle size range between ~30-35.

Using scanning electron microscopy coupled with energy dispersive X-ray (SEM/EDX), the final product was found to comprise Cu (80-90% approx.) in pure form, i.e., not oxidized or mixed with Al. However, some of the Cu was found partially covered and/or contaminated by aluminum oxide (5-10% approx.).

XRD (X-ray diffraction) analysis showed that aluminum was oxidized to a significant extent to result in almost complete removal of the aluminum from copper. This analysis also showed a double boundary layer of aluminum oxide phase evident on the surface of the larger size copper particles as was seen in the SEM analysis. Further fragmentation occurs at the double boundary layer on account of violent ignition which is evidence that impurity metal atoms are being transported from the particle's interior to its exterior surface by thermal convection currents of induced circulation viscous shear which are preferably at a steady velocity of 8-10 m/s for the purposes of the present methods. Impurity-rich aluminum particles that fragment from the double boundary layer burn until all the aluminum is oxidized.

Thus, the present method was useful to separate copper from a copper-aluminum alloy.

Example 2—Varying Treatment Conditions of a Copper-Containing Alloy—High Power

A Cu—Al alloy (91% Cu and 9% Al) wire was arced in a conventional wire arc plasma spray machine and simultaneously atomized in a first run by impacting air at 70 psi, and in a second run by impacting pure oxygen gas at 90 psi. Both atomization runs were conducted in a cylindrical shaped reactor isolated from ambient atmospheric conditions. The power setting used was 35.5 Volts (and about 260 Amps or somewhat less) to yield approximate plasma spray temperatures of ~(1300-1350)° C.

The first run at high arc heat in air atomization produced a lower initial rate of viscosity change under initial arc oxidation. When impacted by 70 psi, there was less resistance to fragmentation yielding a particle size range averaging 120 microns. At somewhat lower particle heat and lesser number of internal circulating viscous shear current cycles produced a lower rate of oxidation. The rate of internal heat storage was lower than the rate of viscosity change causing particles to freeze before complete oxidation was reached. A nominal 25% wt. of copper remained unoxidized, copper oxide formed was about 33.24% by wt, and all the aluminum was oxidized. This illustrates how the present method may be used in the production of a composite material having a particular metal/metal oxide(s) wt. fraction.

The second run resulted in greater oxidation (98%) and particles averaging 200 microns in size. Initial molten metal load gained a very high viscosity rate of change (at the high end of the range 4.5-6.0 $m^2 s^{-1}$) due to the high oxygen activity. At high internal heat and a large molten mass, a higher number of internal circulating viscous shear current cycles resulted in a high rate of copper oxidation (60.4% by wt) and all aluminum was oxidized. SEM examination of the particles showed that the majority of the oxide content was produced in-flight before the particle began to cool. The conditions used in this experiment could be used to oxidize all non-noble solute metals associated with impure gold to render their separation from gold in oxide form.

Example 3—Varying Treatment Conditions of a Copper-Containing Alloy—Low Power

A Cu—Al alloy (91% Cu and 9% Al) wire was arced in a conventional wire arc plasma spray machine and simultaneously atomized in a first run by impacting air at 70 psi. and in a second run by impacting pure oxygen gas at 90 psi. Both atomization runs were conducted in a cylindrical shape reactor isolated from ambient atmospheric condition. The power setting used was maintained at 150 Amperes (approx. 26.5 volts).

The first run using air at 70 psi resulted in a lower oxidation of internal solute metals, yielding a particle size of about 70 microns, less internal heat storage and less internal circulating viscous shear current cycles, and a high % wt. of the solvent copper base metal was left unoxidized. Total copper oxide=18.00% wt. In contrast, the second run using oxygen at 90 psi resulted in a high viscosity rate of change (at the high end of the range 4.5-6.0 $m^2 s^{-1}$) and an average particle size of ~120 microns, resulting in high level of oxidation of copper (total copper oxide=41.19% wt) and all aluminum was oxidized.

Example 4—Varying Treatment Conditions of a Copper-Containing Alloy—High Power

A Cu—Al alloy (91% Cu and 9% Al) wire was arced in a conventional wire arc plasma spray machine and simultaneously atomized in a first run by impacting air at 70 psi. and in a second run by impacting pure oxygen gas at 90 psi. Both atomization runs were conducted in a cylindrical shape reactor isolated from ambient atmospheric condition. The power setting used was maintained at 260 Amperes (less than 35.5 V).

The oxidation results were somewhat higher than those using a lower power setting (150 amps as in Ex. 3). The first run resulted in oxidation levels for copper of 32.35% wt. and aluminum was completely oxidized. The second run resulted in higher oxidation of internal solute metals (total copper oxide=49.25% wt) and aluminum was completely oxidized.

Example 5—Purification of Silver from a Silver-Containing Alloy

The present method is applied to a silver-containing alloy having 52% Ag, 34% Cu and 13% Zn. In this example the overall oxidation potential difference between the silver and the least of the two impurity metals (Zn) is 1.999 EV, while copper has an oxidation potential which is closer to Ag.

Method:

The method utilized is similar to that described in Example 1. Arc runs are conducted using air at an air pressure setting of 70 psi, and at two power settings, namely, 30 volts and 20 volts at current settings of 260 and 150 amps, respectively, producing approximate plasma spray temperatures of ~(1250-1350)° C. and ~(1075-1150)° C., respectively.

Results:

After plasma oxidation spray, the majority of zinc and some of the copper will be oxidized and readily removed from the silver using a dilute non-aggressive acid.

The resultant un-oxidized powder particles would, thus, contain un-oxidized silver, some copper and trace or insignificant amount of zinc. When re-melted and drawn into a wire, the resultant new alloy will be close in composition to sterling silver (92.5% Ag-7.5% Cu). This resultant product is exposed to plasma oxidation to separate further the copper impurity therefrom. The difference in the oxidation potential between silver and copper is 0.27 EV (270 millivolts) at STP. This is a large enough difference to permit selective oxidation of copper according to the present method. It is noted that electrochemical cathodic polarization of silver over copper can produce an overpotential difference greater than 0.5 EV.

Example 6—Preparing Metal Compounds with Varying Oxide Content

A wire arc plasma spray machine with a conical reactor was used to arc an alloy (91% Cu and 9% Al) wire at two power settings, 26.5 V (volt/power setting—approx. 150 Amps) (Run 2) and 36.5 V (approx. 260 Amps) (Run 1), respectively, at an atomizing air pressure of 70 psi.

Total oxides resulting at the 26.5 V setting was 71.11% wt. Aluminum was nearly 100% oxidized and the particles were predominately spherical with a high count of large particles that measured ~65 microns in diameter. Total oxides resulting at the 36.5 V setting was 67.55% wt., and particles were less spherical than those achieved at the lower power setting with less particles resulting and particles were about ~35 microns. Thus, the lower power setting resulted in a larger number of predominantly spherical particles of larger size. Particle size measurements were estimated using corresponding images at low and high magnification and the inset micron scale on each micrograph.

Elemental composition resulting from the above treatments was as follows:

TABLE 1

| | XRD Summary | | | | | |
|---|---|---|---|---|---|---|
| | Cu | Al | CuO | $Cu_2O$ | $Al_2O_3$ | Cu(85%) + Al(15%) |
| Run #1 | 20.7% | 1.48% | 7.15% | 16.06% | 44.34% | 10.27% |
| Run #2 | 16.75% | 0.61% | 1.91% | 13.33% | 55.9% | 11.5% |

This data confirms that altering the process parameters is useful to alter the oxide content of an alloy treated using the present method.

Example 7—Combined Treatment of Different Alloys

Two alloy wires of different compositions and close in melting temperatures were arced together as described in previous examples, and simultaneously atomized with pure oxygen gas (at 90 psi). The cathode wire was a yellow brass composition of 60Cu40Zn (60% Cu and 40% Zn) having a melting point of ~900° C., and the anode wire was an alloy of 52Ag34Cu14Zn (52% Ag, 34% Cu and 14% Zn) having a melting temperature of 760° C. Both wires were arced together inside a cylindrical shaped reactor isolated from atmospheric conditions. The power setting was kept high at 260 Amperes (within voltage range of 26.5-35.5). The silver alloy, 52Ag34Cu14Zn, was also arced as previously described with air at 70 psi using the same power setting.

Results indicated a high level of oxidation for the combination of alloys treated with oxygen. Total copper and zinc oxide particles 70.85% wt. Initial molten metal load gained a very high viscosity rate of change (e.g. at the high end of the range 5.5-7.5 $m^2$ $s^{-1}$) at high oxygen activity. The gas pressure setting of 90 psi resulted in fragmentation producing particles with an average size of ~120 microns. At high internal heat and a large molten mass, a higher number of internal circulating viscous shear current cycles result, to yield a high rate of copper and zinc oxidation. SEM examinations of the particles showed that a majority of the oxide content was produced during in-flight before the particle began to cool. Results for the silver alloy in the presence of air illustrates different proportions of oxidation and other compound formation as expected in view of the conditions utilized.

The XRD results obtained from Examples 2-4 and 7 are summarized below in Table 2.

TABLE 2

XRD Summary of Wire Arc spray using two Base Metal Alloys

|  | 91Cu9Al | | | | | | | | 52Ag34Cu14Zn & 60Cu40Zn | |
|---|---|---|---|---|---|---|---|---|---|---|
|  | Conical Reactor Process Control Settings | | Barrel Reactor Process Control Settings | | | | | | Barrel Reactor Process Control Settings | |
|  | | | Experiment #2 | | Experiment #3 | | Experiment #4 | | Experiment #5 | |
| Metal/Metal Oxide | Volts 36.5 Atomizing Gas Air | Volts 26.6 Atomizing Gas = Air | Volts 35.5 Atomizing Gas = Air | Volts 35.5 Atomizing Gas O₂ | Current 150 A Atomizing Gas = Air | Current 150 A Atomizing Gas: O₂ | Current 260 A Atomizing Gas: Air | Current 260 A Atomizing Gas: O₂ | Volts Can Range from 35.5-26.5 Atomizing Gas Air | Volts Can Range from 35.5-26.5 Atomizing Gas O₂ |
| Run # | 1 | 2 | 1 | 2 | 1 | 2 | 1 | 2 | 1 | 2 |
| Gas psi | 70 | 70 | 70 | 90 | 70 | 90 | 70 | 90 | 70 | 90 |
| Change in Viscosity rate |  |  | Medium High | Very High | Medium | High |  | Very High | Medium Low | Very high |
| Cu | 20.70 | 16.76 | 25.23 | 02.16 | 36.20 | 13.44 | 30.06 | 14.28 | 2.47 | 2.23 |
| Cu₂O | 16.06 | 13.30 | 17.92 | 24.48 | 9.91 | 19.52 | 13.59 | 35.72 |  |  |
| CuO | 7.15 | 1.91 | 15.32 | 35.93 | 9.09 | 21.67 | 18.76 | 13.53 | 4.52 | 33.88 |
| Al₂O₃ γ | 25.36 | 36.39 | 16.64 | 6.81 | 45.79 | 45.37 | 8.24 | 36.47 |  |  |
| Al2O3 δ | 18.98 | 19.51 | 17.46 | 30.40 | 0.00 | 0.00 | 29.36 | 0.00 |  |  |
| 85Cu15Al | 10.27 | 11.50 | 7.42 | 0.22 | 0.00 | 0.00 | 0.00 | 0.00 |  |  |
| Al | 1.48 | 0.61 | 0.00 | 0.00 | 0.00 | 0.00 | 0.00 | 0.00 |  |  |
| ZnO |  |  |  |  |  |  |  |  | 23.28 | 36.97 |
| CuZn |  |  |  |  |  |  |  |  | 21.43 | 2.52 |
| Ag |  |  |  |  |  |  |  |  | 36.37 | 24.40 |
| AgCu |  |  |  |  |  |  |  |  | 1.92 | 0.00 |
| Average Particle Size | ~35 microns | ~65 microns | ~120 microns | ~150 microns | ~70 microns | ~120 microns | ~100 microns | ~120 Microns | ~30 Microns | ~120 microns |

The invention claimed is:

1. A method of selectively oxidizing one or more target metals in an alloy comprising at least one target and at least one non-target metal, the method comprising the steps of:
   i) exposing the alloy to a temperature in the range of 1150-2000° C. that is about 15-25% less than the melting temperature of the alloy in the presence of a pressurized oxygenated atomizing gas comprising 15-100% oxygen to melt the alloy and to result in simultaneous fragmentation and oxidation of the molten alloy using a thermal spray device under conditions sufficient to yield an oxidation potential that oxidizes one or more target metals in the alloy and does not oxidize the non-target metal; and
   ii) allowing the treated alloy to solidify to yield solidified oxidized target metal and solidified unoxidized non-target metal, wherein the oxidized target metal and unoxidized non-target metal are each in a form which permit collection of the oxidized target metal and the unoxidized non-target metal separately.

2. The method of claim 1, wherein the oxygenated atomizing gas is applied at a pressure in the range of 60-100 psi to the molten alloy to fragment and oxidize target metals in the alloy.

3. The method of claim 1, wherein the thermal spray device is a wire arc thermal spray device.

4. The method of claim 1, wherein the alloy is melted using a power of 26.5-35.5 Volts and 150-260 Amperes, and an atomizing gas pressure in the range of 60-100 psi.

5. The method of claim 1, wherein the alloy comprises greater than 50% of the non-target metal.

6. The method of claim 1, wherein the non-target metal is a precious metal.

7. The method of claim 1, wherein non-target metal is selected from the group consisting of: ruthenium (Ru), rhodium (Rh), palladium (Pd), silver (Ag), osmium (Os), iridium (Ir), platinum (Pt), gold (Au), rhenium (Re), nickel (Ni) and copper (Cu).

8. The method of claim 1, wherein the oxygenated atomizing gas is oxygen-enriched air or pure oxygen gas.

* * * * *